T. G. BRATSCH.
PEDAL.
APPLICATION FILED MAR. 8, 1915.
1,227,741.
Patented May 29, 1917.
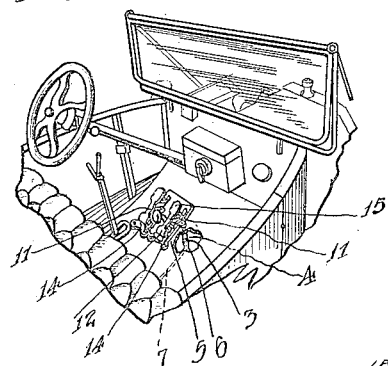
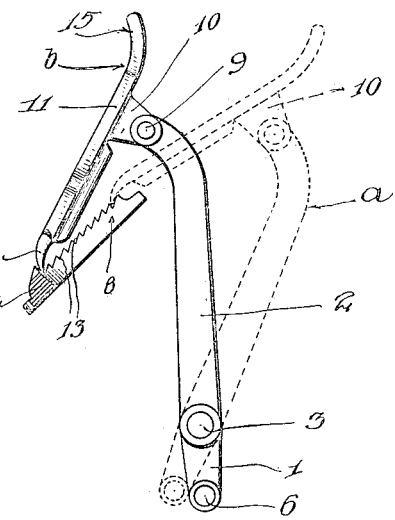
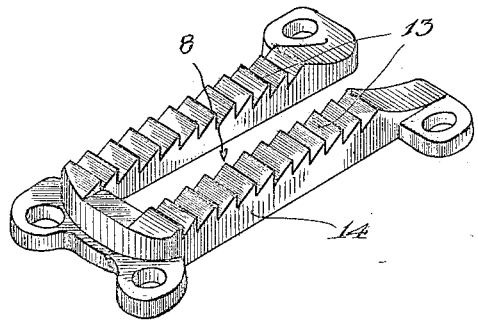
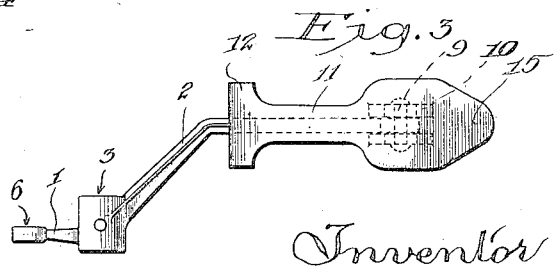
Inventor
Theodore G Bratsch

UNITED STATES PATENT OFFICE.

THEODORE G. BRATSCH, OF ORANGE, CALIFORNIA, ASSIGNOR OF THREE-FOURTHS TO JOEL B. HANDY, OF ORANGE, CALIFORNIA.

PEDAL.

1,227,741.   Specification of Letters Patent.   Patented May 29, 1917.

Application filed March 8, 1915. Serial No. 12,850.

*To all whom it may concern:*

Be it known that I, THEODORE G. BRATSCH, a citizen of the United States, residing at Orange, in the county of Orange and State of California, have invented a new and useful Pedal, of which the following is a specification.

Broadly an object of this invention is to render the driving of automobiles easier and more convenient than has heretofore been possible.

More specifically an object is to make provision for holding the foot pedals in numerous positions to which they may be adjusted, said foot pedals being ordinarily used in automobiles to operate the brake and in some instances to shift the gears for change of speed.

Merely for illustrating purposes the invention is described herein more particularly as being applied to a Ford car, but of course the invention could possibly be applied elsewhere to good purpose.

In Ford cars there are several foot pedals, one of these being connected to the brake mechanism and another being connected to the speed changing device, and these pedals are designed to be held against backward movement by pressure of the driver's feet, and it is an object of this invention to make provision to releasably hold said pedals in such manner that they may be instantly released by slight pressure of the driver's feet.

Another object is to effect the foregoing without the use of springs and to produce a device of this character which is essentially simple both in construction and operation.

Another object is to so construct the device that the driver's foot may be readily slid from the floor of the automobile onto the foot plate so that the foot is adjusted to the pedal-operating position with maximum quickness in order to avoid, as nearly as possible, accidents that might otherwise result.

The accompanying drawings illustrate the invention.

Figure 1 is a perspective view of the invention applied to an automobile, of which a fragment is shown.

Fig. 2 is a side elevation, partly in section, of the invention, solid lines indicating a neutral position and broken lines indicating a gear-shifted position.

Fig. 3 is a plan view of Fig. 2 omitting the ratchet.

Fig. 4 is a perspective view of the ratchet shown in the preceding views.

For each pedal there is provided a lever of the first class having a shorter arm 1 and a longer arm 2 and pivoted at 3 to a support 4 beneath the floor 5 of an automobile; and said shorter arm 1 is pivoted at 6 to a connecting rod 7 which extends to speed changing, brake or other mechanism, not shown, that is to be controlled by movement of the lever; and said longer arm 2 extends up through a slot 8 in the support and is pivoted at 9 to ears 10 projecting from the under side of a foot plate 11 which constitutes a lever of the first class.

The foot plate 11 is provided at its rear end with a downwardly curved portion forming a dog or pawl 12 integral therewith and designed to engage the notches 13 of a bifurcated ratchet member 14 of which the furcations extend along the sides of the slot 8. The forward end of the foot plate 11 is upwardly curved to form a toe-piece 15 so as to greatly facilitate upward tilting of the pawl 12 forward by pressure of the driver's foot.

An advantage of having the pawl 12 at the rear end of the foot plate 11 is that thereby the ratchet member 14 may be made considerably shorter than the distance through which the lever 1, 2 operates when the pawl travels from one end of said ratchet member to the other end thereof; and that natural pressure of the driver's foot on the foot plate will always tend to force the pawl into the notches 13 because said foot plate is pivoted forward of the point of balance of said foot plate.

Furthermore it is noted that in practical use, this newly invented device adjusts much better under the pressure of the foot than prior devices of somewhat the same construction because the foot plate is substantially as long as the operator's foot and the pawl is located adjacent the heel of the operator's foot.

It is also clear that by reason of the hereinbefore described construction the foot plate extends substantially to the level of the floor of the vehicle, thereby enabling the operator to very readily slide his foot from the floor to the foot plate and from the foot plate to the floor, and this is very important because the foot is shifted from one to the other quite frequently in operating an automobile and the quickness with which it may be shifted, especially from the floor to the foot plate is of prime importance in the prevention of accidents.

To illustrate the great utility of this device, it may be assumed, for example, that the connecting rod 7 is connected to speed changing mechanism designed to be set in the different positions for low speed, high speed and neutral; and it may be further assumed that said speed changing mechanism is in the low speed position when the lever is in the forward broken line position *a*, Fig. 2, with the pawl 12 in the foremost notch of the ratchet member 14; and that said gear shifting mechanism is in the neutral position when the lever is in the solid line position *b*, Fig. 2, with the pawl in the rear notch of the ratchet member; and that said speed changing mechanism is in the high speed position when the pawl is out of engagement with the ratchet member and the lever is thrown rearward to the rear part of the slot 8. The lever is normally retracted, when the pawl is out of commission, by the speed changing mechanism, in the usual way.

From the foregoing it is clear that in practical operation the driver or operator will operate the speed changing mechanism to obtain low or high speed or effect neutral positions of the gears by pressing the lever forward to the broken line position *a* or to the intermediate solid line position *b;* and that said lever will be held in either of said positions or any intermediate adjusted position by the driver or operator allowing the foot plate 11 to swing downward to bring the pawl into engagement with the appropriate notch of the ratchet member 14.

When the driver or operator desires to change the position of the lever, he will press upon the forward end or toe-piece 15 of the foot plate 11 so as to raise the pawl 12 from engagement with the ratchet member 14 and will then press upon the lever to move it forward or will remove pressure from the lever so as to allow said lever to be retracted by the usual spring, not shown, that is ordinarily employed in the speed changing mechanism.

If the pedal is connected to the brake mechanism, said pedal will be operated the same way as above described to hold the brake in commission at any desired degree of braking power.

What I claim is:

The combination with the floor of an automobile, of a notched member mounted on said floor, a lever extending through said floor and pivoted to swing lengthwise of the notched member, and a foot plate pivoted a substantial distance forward of its mid length to the upper end of the lever and having its forward end upturned and having its rear end downturned to form a pawl adapted to engage the notched member so that the driver's foot can be readily slid from the floor onto the foot plate.

In testimony whereof, I have hereunto set my hand at Los Angeles, California, this 17th day of February, 1915.

THEODORE G. BRATSCH.

In presence of—
  GEORGE H. HILES,
  LORA M. BOWERS.

Copies of this patent may be obtained for five cents each, by addressing the "Commissioner of Patents, Washington, D. C."